L. ANDERSON.
VEHICLE WHEEL.
APPLICATION FILED FEB. 13, 1917.
1,233,161. Patented July 10, 1917.
5 SHEETS—SHEET 1.
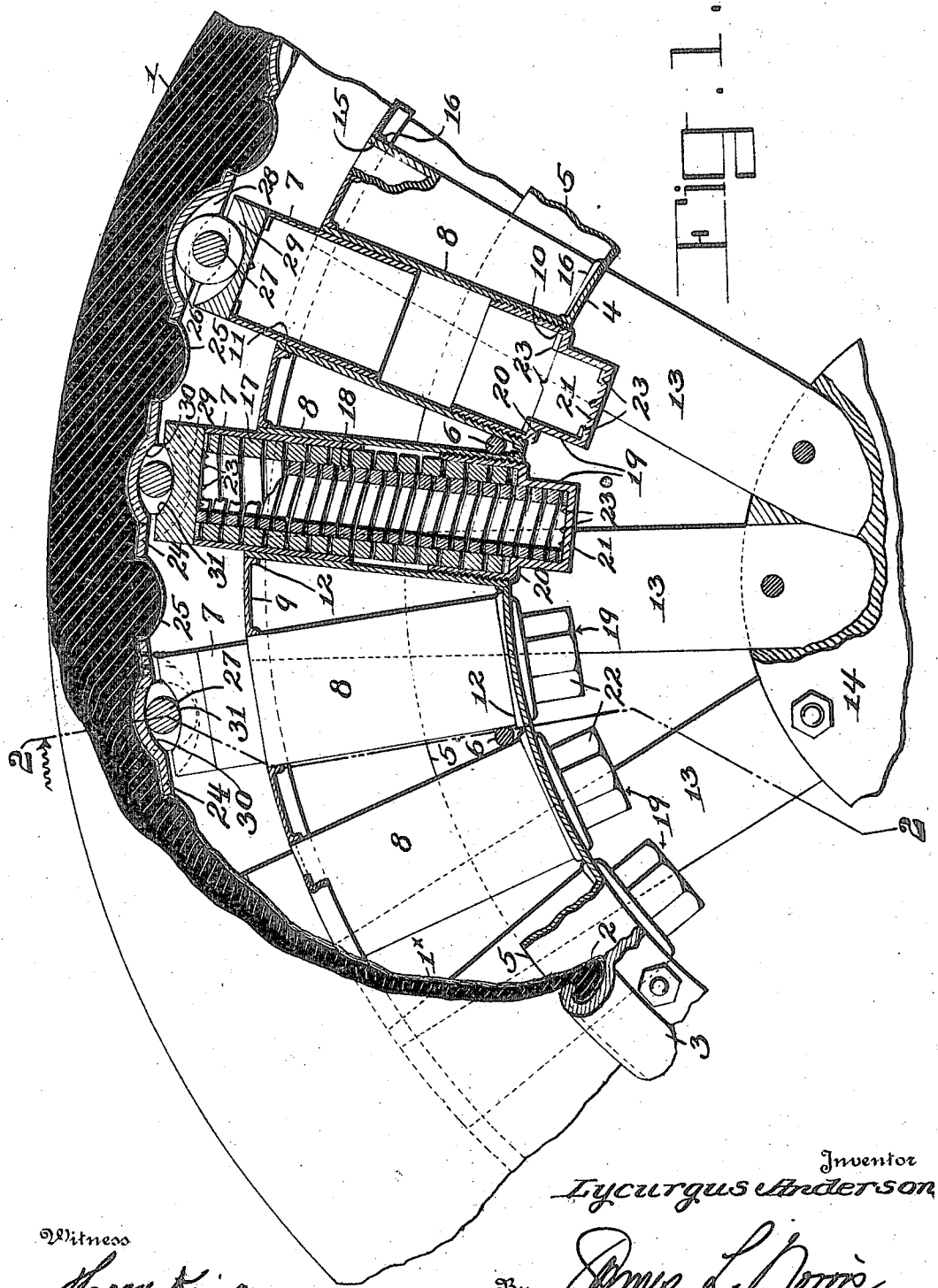
Witness
Harry King.
John Powers.
Inventor
Lycurgus Anderson
By James L. Norris
Attorney

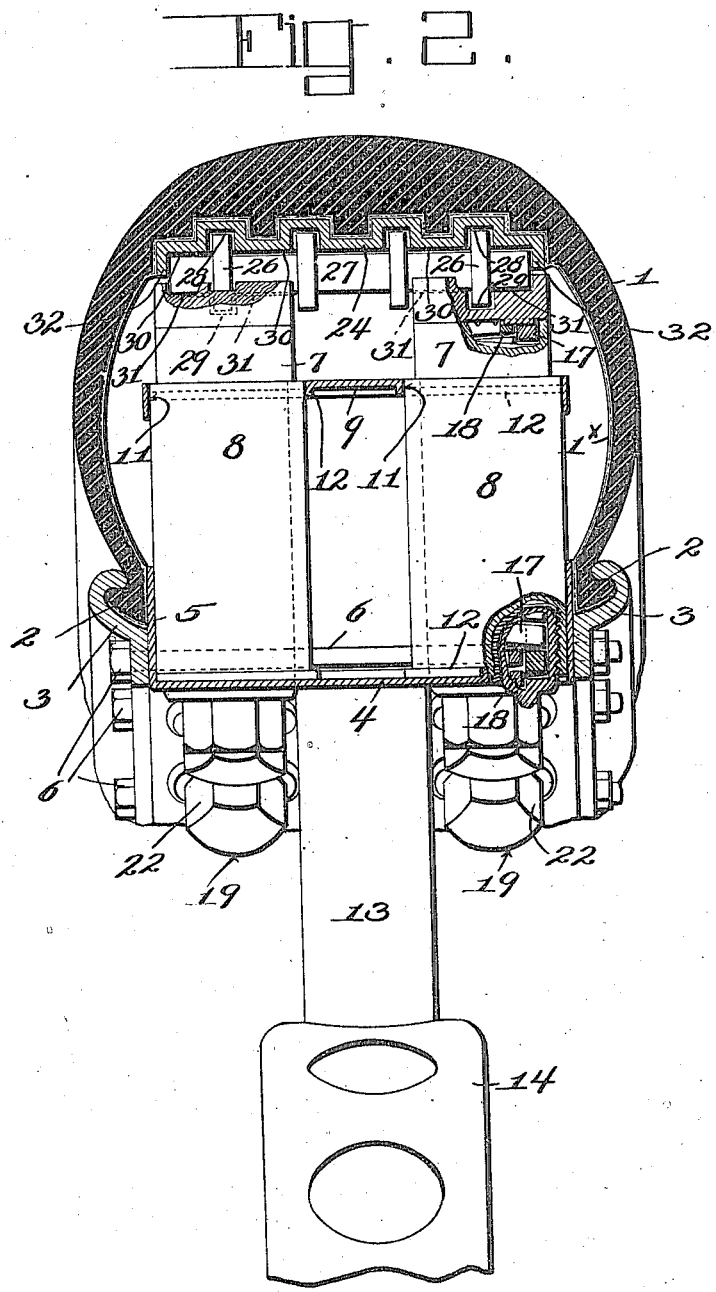

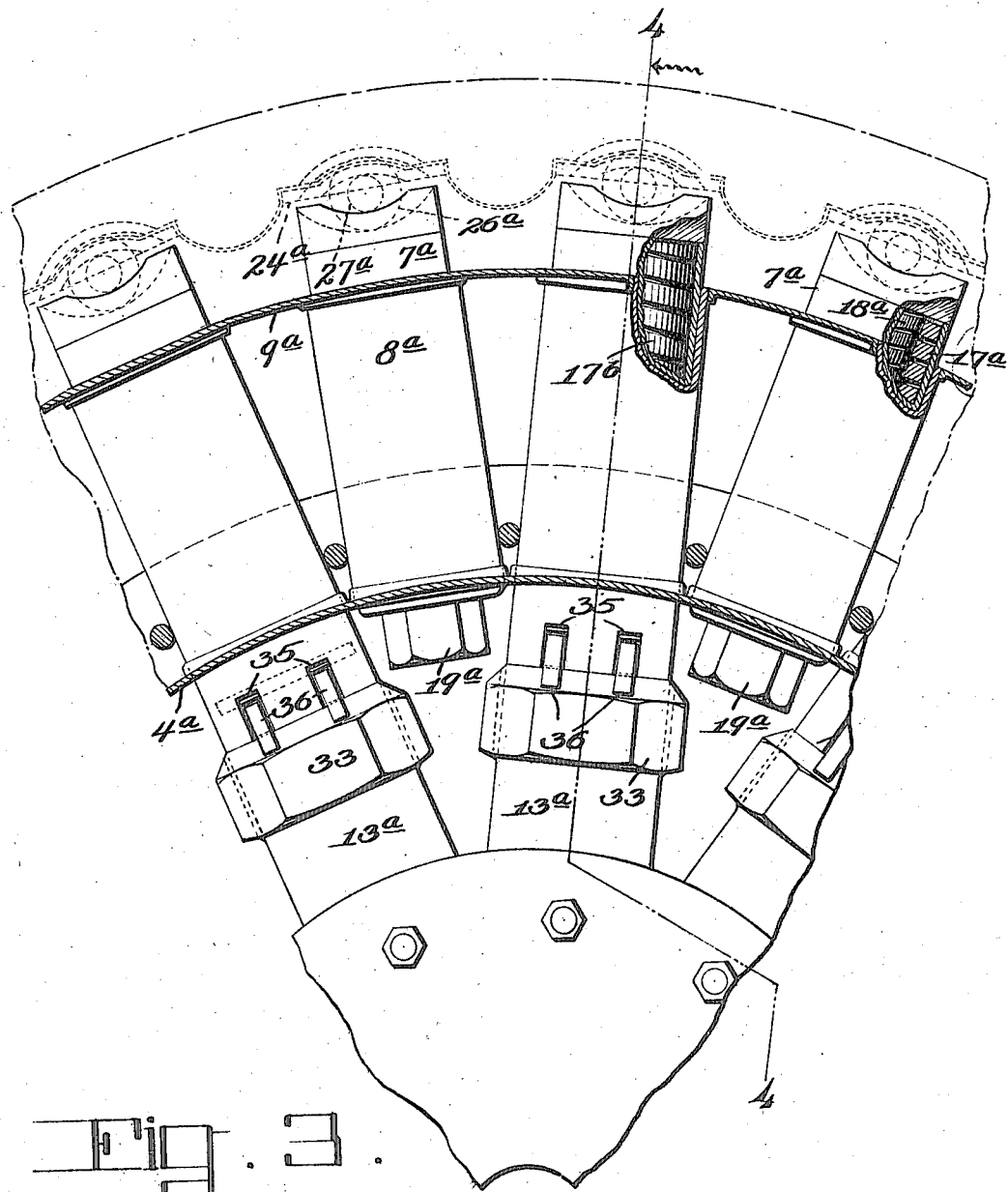

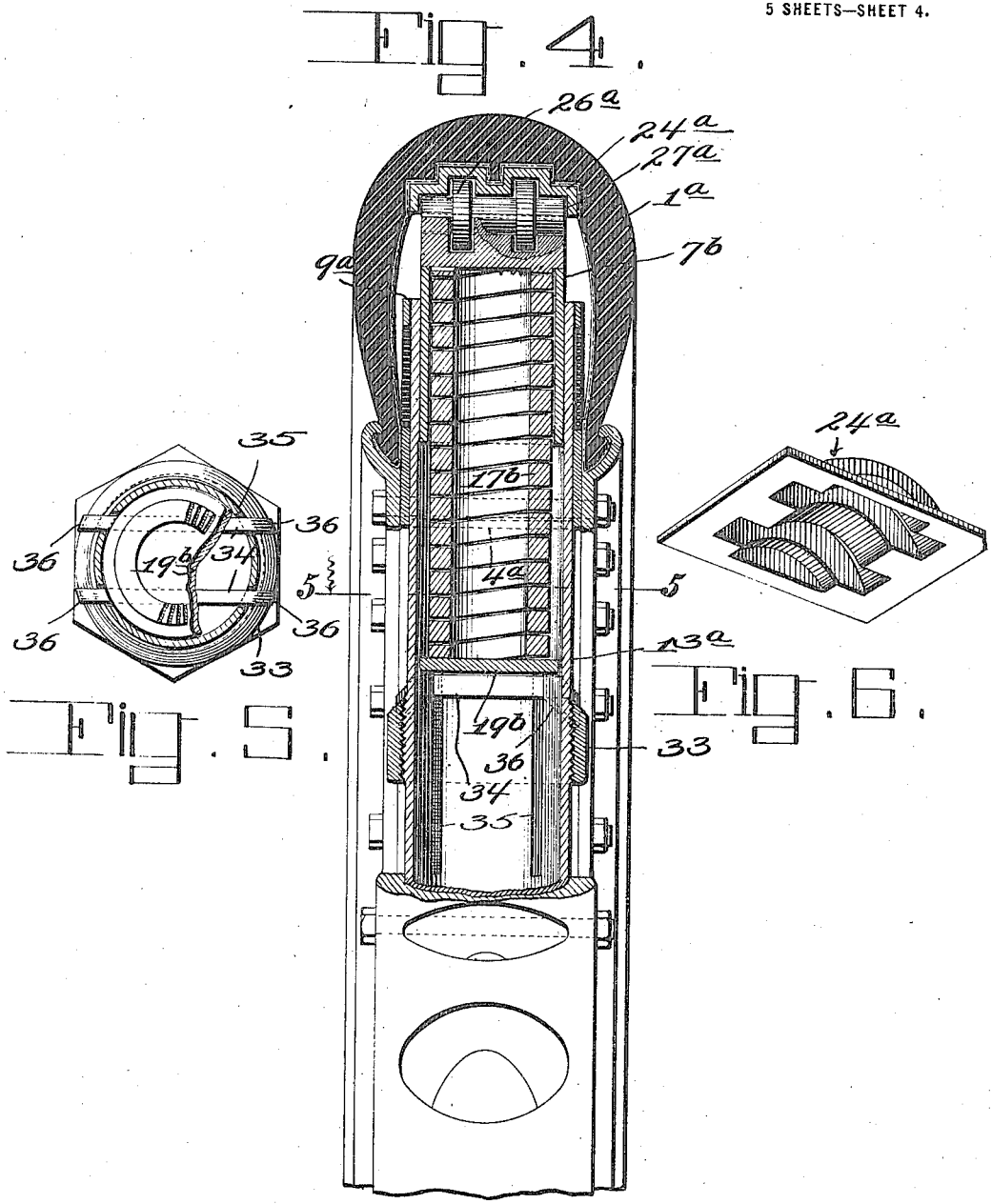

L. ANDERSON.
VEHICLE WHEEL.
APPLICATION FILED FEB. 13, 1917.

1,233,161.

Patented July 10, 1917.

Inventor
Lycurgus Anderson

Witness
Harry King
John Powers

By James L. Norris
Attorney

UNITED STATES PATENT OFFICE.

LYCURGUS ANDERSON, OF LAKE CREEK, TEXAS.

VEHICLE-WHEEL.

1,233,161.  Specification of Letters Patent.  Patented July 10, 1917.

Application filed February 13, 1917. Serial No. 148,381.

*To all whom it may concern:*

Be it known that I, LYCURGUS ANDERSON, a citizen of the United States, residing at Lake Creek, in the county of Delta and State of Texas, have invented new and useful Improvements in Vehicle-Wheels, of which the following is a specification.

This invention relates to improvements in vehicle wheels of that general type which embodies a flexible tread and radially arranged springs for absorbing shocks and cushioning the yielding action of the parts of said tread, a prior construction of this type being disclosed in my Patent No. 1,096,817 of May 19, 1914 upon which the present invention may be regarded as an improvement.

The objects of the present invention, briefly stated, are to provide a wheel of the type referred to which shall be simply and durably constructed, which shall have easy riding and efficient tractive properties, wherein the springs are completely inclosed and protected yet are readily and individually accessible, wherein the tension and consequent action of the springs may be conveniently regulated in accordance with the contemplated load, and wherein the parts may be assembled with comparative ease and facility and without the difficulties frequently encountered in assembling wheels of the general type referred to.

With the above objects in view, the invention consists in certain novel features of structure, combination and relation which will appear as the description proceeds.

In the accompanying drawings, two embodiments of the invention are illustrated, one of which is a construction applicable to heavy passenger automobiles or heavy automobile trucks and the other of which is a construction applicable to light delivery trucks or pleasure vehicles.

In said drawings—

Figure 1 is a detail view, partly in vertical longitudinal section and partly in side elevation, showing a wheel of a construction which is applicable to heavy vehicles.

Fig. 2 is a cross-sectional view on the line 2—2 of Fig. 1.

Fig. 3 is a detail view, partly in section and partly in side elevation, of that construction which is applicable to light vehicles.

Fig. 4 is a cross-sectional view on the line 4—4 of Fig. 3.

Fig. 5. is a detail horizontal sectional view on the line 5—5 of Fig. 4.

Fig. 6 is a detail perspective view of a tread plate embodied in the construction shown in Fig. 4.

Figure 7:
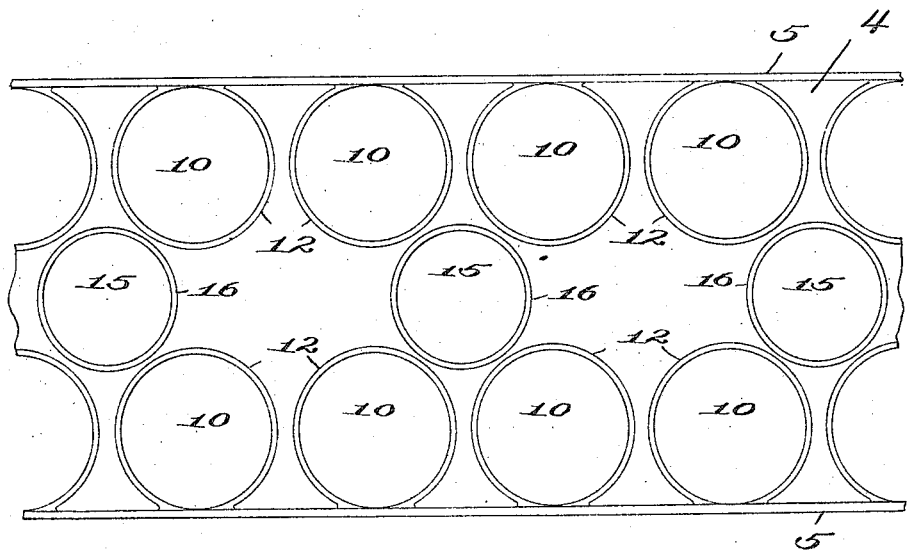
Figure 8:
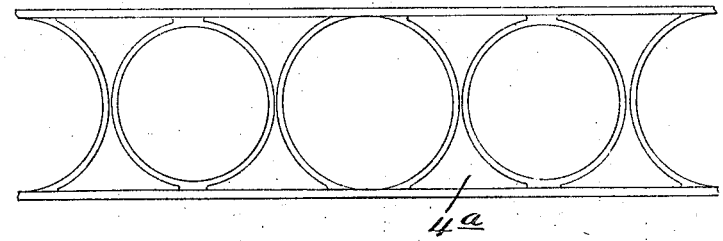

Figs. 7 and 8 are developed plan views of the fellies, intended to show more particularly the arrangement and relation of the spring-operated plungers and the spokes in the respective embodiments of Figs. 1 and 3.

Similar characters of reference designate corresponding parts throughout the several views.

Referring to Figs. 1, 2 and 7:

The improved wheel is designed essentially for use in connection with a flexible casing 1 preferably of rubber, and which may be similar as regards external form and general proportions to the outer casing of an ordinary pneumatic tire. The casing 1 is formed along its margins with clencher beads 2 which are gripped, in the usual manner, to insure of the retention of said casing on the felly, by flanges 3, these being detachable in the present embodiment.

The felly 4 consists of an integral band of sheet metal and has at its sides outwardly directed flanges 5 against which the flanges 3 are held by bolt-and-nut fastenings 6, the flanges 5 being prolonged sufficiently to provide backings for the clencher beads 2.

The requisite cushioning action is secured by means of spring-pressed plungers 7 which are axially slidable in cylinders 8 arranged radially and equidistantly. The cylinders 8 are supported by and extend between the felly 4 and an annular band 9 arranged within the casing 1 in concentric surrounding relation to said felly. The felly 4 and band 9 are generally similar in construction in that they are provided with openings 10 and 11, respectively, said openings preferably having their edge portions swaged to provide flanges 12 to which the cylinders 8 are secured by welding or otherwise, the marginal portions of said cylinders being disposed within said openings, as clearly shown in Fig. 1.

As adapted for heavy passenger automobiles or delivery trucks, there will be two groups of plungers 7 and cylinders 8 arranged, symmetrically, at opposite sides of the central plane of the wheel and of the spokes 13, as best shown in Fig. 2. The spokes 13, which are preferably of hollow cylindrical form, radiate in the usual manner from a central hub 14 of solid or other suitable construction and are preferably secured in the felly 4 and band 9 in the same manner as the cylinders 8; that is to say, said felly and band are provided with openings 15 through which the spokes extend and whose marginal portions are swaged to provide flanges 16 to which the spokes are secured by welding or otherwise.

The plungers 7 project through and beyond the open outer ends of the cylinders 8 and are acted on by helical springs 17 and 18, the former closely surrounding the latter. The plungers 7 are preferably of cupped construction; and the springs 17 and 18 fit within said plungers and at their inner ends bear against caps 19 which serve both as closures for the inner ends of the cylinders 8 and as means for adjusting the tension of the springs. The caps 19 are threaded within the cylinders 8 and are preferably formed with internal steps or shoulders 20 and 21 upon which the respective springs 17 and 18 seat, the shoulders 21 being constituted by the closed ends of the caps. The portions of the caps which extend between the steps 20 and 21 and which will be located in whole or in part beyond the inner ends of the cylinders 8, i. e., externally, are formed with flat faces, hexagonally or otherwise, to serve as operating nuts 22 when gripped by a wrench or pliers.

In order to positively prevent the caps 19 from turning in consequence of vibration, the terminal convolutions of the springs are provided with radial recesses and the surfaces against which the said convolutions bear are provided with radial ribs 23, preferably of triangular cross-section, which have interlocking engagement in said recesses but which do not interfere with the turning of the caps 19 by a wrench or other implement for the purpose of moving said caps farther into or out of the cylinders 8 and thereby increasing or decreasing the normal compression of the springs.

For receiving the cushioning thrusts of the plungers 7, a flexible system of tread plates 24 is provided. According to the present invention, the flexibility of the system of tread plates is secured by their arrangement at equidistant intervals and in disconnected relation whereby each plate may move in any direction in the major or longitudinal plane of the wheel. The tread plates 24 fit in conforming recesses in the inner face of the casing 1 and they are positively separated from one another by bumper and spacing lugs 25 integral with said casing and which project and have a close fit between the adjacent ends of said plates. It is preferred to locate the tread plates in the casing 1 in connection with the molding of said casing whereby the tread plates themselves mold the recesses in which they fit and are adhesively connected to the casing which preferably has its inner face lined throughout the several plies of cotton fabric 1× as an internal reinforcement and wear-resisting medium.

In order to transmit thrusts from the plunger 7 to the tread plates 24 or from said plates to said plungers and also to permit said tread plates to pivot and slide in the longitudinal plane of the wheel relatively to said plungers, rollers 26 are provided. As preferred and shown in Fig. 2, the tread plates for each pair of transversely alined plungers are integrally connected and the rollers 26 between said tread plates and plungers are mounted on a common stem 27 which preferably has a rolling bearing on the parts between which it is interposed. For the purposes of centering said rollers and providing a tractive surface for their action the tread plates are formed with channels 28 having concave roller-engaging surfaces of greater curvature and extent than the rollers and the plungers are formed with similar channels 29 confronting the channels 28. Where, as is preferred, the stems 27 also have rolling bearings on the adjacent parts, the tread plates and plungers are formed at the sides of the channels 28 and 29 with concave bearing surfaces 30 and 31, respectively. In order to confine the stems 27 against endwise play and enable the rollers 26 to be held out of contact with the sides of the channels 28 and 29 the tread plates are provided with end abutments 32 overlying the ends of the stems.

The springs 17 alone act to relieve the vibrations or jars within a certain normal range; but for the heavier vibrations both springs act in concert and mutually relieve one another. The caps 19 provide means for regulating the compression of the springs in accordance with the contemplated normal range of vibrations and accordingly are initially adjusted whereby the springs 17 will have a certain normal load-resisting compression but the springs 18 are relatively slack or under such light compression that their sensible action requires a much stronger compression thereof, as by a jar or shock beyond the normal resisting capacity of the springs 17. Since the caps 19 are externally accessible, the adjustment of the compression of the springs may be conveniently and quickly effected and, in the use of the wheel, practised from time to time as need may require.

In case any of the springs become broken a new one may be substituted with convenience and quickness since such substitution requires only the removal of the cap 19 which provides a bearing for the broken spring. When the cap has been removed the broken spring may be pulled from the cylinder 8 and a new one inserted in its place through the opening normally closed by said cap.

The construction described greatly facilitates the fitting of the casing 1. During this operation, the caps 19 are backed as far as possible from the cylinders 8 whereby the springs 17 and 18 will be under very light, if any, compression and will interpose no serious obstacles to the ready connection of the casing to the felly in the usual manner; as the attachment of the casing progresses, the stems 27 and rollers 26 are fitted in their operative positions and remain centered relatively to the tread blocks and plungers by the engagement of the rollers 26 in the relatively deep channels 28 and 29.

Referring to Figs. 3, 4, 5, 6 and 8:

This construction differs from the one above described in that there is but a single series of annularly arranged cushioning springs and plungers which are disposed in the common plane of the spokes. The casing $1^a$, felly $4^a$, band $9^a$, tread plates $24^a$, rollers $26^a$, roller stems $27^a$, cylinders $8^a$ and plungers $7^a$, springs $17^a$ and $18^a$ and caps $19^a$ arranged in said cylinders are of generally the same construction and relation as the correspondingly named and designated parts of the construction above described. However, by virtue of the fact that the plungers and springs are arranged in the common plane of the spokes, it is convenient to use the spokes as casings for certain of the plungers and springs and to arrange the cylinders $8^a$ between the spokes. In these respects, the present construction follows, broadly, the arrangement shown in my Patent No. 1,058,518 of April 8, 1913.

The structural differences involved are confined to the construction of the spokes and the organization relatively thereto of the plungers. The spokes are shown at $13^a$ and the plungers $7^b$ which operate in the spokes are similar to the plungers 7. Since the present construction is intended only for light vehicles, but a single spring, $17^b$, corresponding to the spring 17 above described, is employed to act on each plunger $7^b$. The spring $17^b$ bears at its outer end against the head of the plunger $7^b$ and at its inner end against a follower $19^b$ which is formed as a disk-shaped plate and is slidable lengthwise of the spoke $13^a$. By adjustment of the position of the follower $19^b$ the compression of the spring $17^b$ may be regulated in a manner which will be obvious from the foregoing description.

For the support and adjustment of the follower $19^b$ an adjusting ring 33 is arranged externally of each spoke $13^a$ and is threaded thereon and a pair of bars 34 upon which the plate $19^b$ rests are supported by the ring 33. The bars 34 are disposed transversely of the spokes and their terminal portions project through radial slots 35 formed in the spokes. The ring 33 is formed with facets whereby it may serve as a nut for engagement by a wrench or pliers in connection with its manipulation to vary the position of the plate $19^b$ and the consequent degree of compression of the spring $17^b$. However, in order to prevent the ring 33 from turning or working loose in consequence of vibration, as also to prevent endwise movement of the bars 34, said bars are formed with angular, down-turned terminal lugs 36 and the ring 33 is formed along its outer edge with recesses in which the lugs 36 seat.

I claim as my invention—

1. In a wheel of the character described, in combination, a flexible casing, a felly to which the casing is attached, a plurality of cylinders carried by the felly and projecting into the casing, tread plates set into the inner face of the casing and corresponding in arrangement to said cylinders, said tread plates being disconnected to one another, spring pressed plungers operating in said cylinders and means for transmitting thrusts from said plungers to said tread plates or from said plates to said plungers whereby said plates may yield in any direction in the longitudinal plane of the wheel relatively to said plungers.

2. In a wheel of the character described, in combination, a flexible casing, a felly to which the casing is attached, a plurality of cylinders carried by the felly and projecting into the casing, tread plates set into the inner face of the casing and corresponding in arrangement to said cylinders, said tread plates being in disconnected relation and the casing having spacing lugs integral therewith projecting between the adjacent ends of the tread plates, spring pressed plungers operating in said cylinders and rollers for transmitting thrusts from said plungers to said plates, or from said plates to said plungers, said plungers and plates both having channels in which said rollers are centered and operate.

3. In a wheel of the character described, in combination, a flexible casing, a felly to which the casing is attached, a plurality of cylinders carried by the felly and projecting into the casing, tread plates set into the inner face of the casing and corresponding in arrangement to said cylinders, said tread plates being in disconnected relation and the casing having spacing lugs integral therewith projecting between the adjacent ends of the tread plates, plungers operating in said cylinders, rollers for transmitting thrusts from said plungers to said plates, or from said plates to said plungers, said plungers and plates both having channels in which said rollers are centered and operate, springs arranged in said cylinders and acting on said plungers to move them toward said tread plates, and means movable lengthwise of the cylinders and externally accessible at the inner side of said felly providing bearings for the inner ends of said springs and serving for the adjustment of the compression thereof.

4. In a wheel of the character described, in combination, a flexible casing, a felly to which the casing is attached, a plurality of cylinders carried by the felly and projecting into the casing, tread plates set into the inner face of the casing and corresponding in arrangement to said cylinders, said tread plates being in disconnected relation and the casing having spacing lugs integral therewith projecting between the adjacent ends of the tread plates, plungers operating in said cylinders, rollers for transmitting thrusts from said plungers to said plates, or from said plates to said plungers, said plungers and plates both having channels in which said rollers are centered and operate, springs arranged in said cylinders and acting on said plungers to move them toward said tread plates, and means movable lengthwise of the cylinders and externally accessible at the inner side of said felly providing bearings for the inner ends of said springs and serving for the adjustment of the compression thereof, said means including an adjustment nut and the plungers, springs and said means being constructed to coöperate in preventing said nut from working loose consequent to vibration.

5. In a wheel of the character described, in combination, a flexible casing, a felly to which the casing is attached, a plurality of cylinders carried by the felly and projecting into the casing, tread plates set into the inner face of the casing and corresponding in arrangement to said cylinders, said tread plates being in disconnected relation and the casing having spacing lugs integral therewith projecting between the adjacent ends of the tread plates, plungers operating in said cylinders, rollers for transmitting thrusts from said plungers to said plates, or from said plates to said plungers, said plungers and plates both having channels in which said rollers are centered and operate, springs arranged in said cylinders and acting on said plungers to move them toward said tread plates, and caps threaded into the inner ends of the cylinders and providing bearings for the inner ends of said springs, said caps being externally accessible at the inner side of the felly for the purpose of adjusting the compression of said springs.

6. In a wheel of the character described, in combination, a sheet metal felly having flanges at the sides thereof and having openings formed at regular intervals therein, a flexible casing having marginal clencher beads, attachment flanges co-acting with said clencher beads and secured to the flanges of said felly, cylinders radiating from said felly and set into the openings thereof, caps closing the inner ends of said cylinders and removable therefrom, said caps being externally accessible at the inner side of the felly, plungers operating in said cylinders, springs disposed in said cylinders and acting on said plungers, tread plates bearing against the inner face of the casing, and means for transmitting thrusts from said plungers to said tread plates or from said plates to said plungers whereby said plates may yield in any direction in the longitudinal plane of the wheel relatively to said plungers.

7. In a wheel of the character described, in combination, a sheet metal felly having flanges at the sides thereof and having openings formed at regular intervals therein, a flexible casing having marginal clencher beads, attachment flanges co-acting with said clencher beads and secured to the flanges of said felly, cylinders radiating from said felly and set into the openings thereof, caps closing the inner ends of said cylinders and removable therefrom, said caps being externally accessible at the inner side of the felly, plungers operating in said cylinders, springs disposed in said cylinders and acting on said plungers, tread plates bearing against the inner face of the casing, means for transmitting thrusts from said plungers to said tread plates or from said plates to said plungers whereby said plates may yield in any direction in the longitudinal plane of the wheel relatively to said plungers, and a sheet metal band concentric to said felly and located within the casing, said band having openings formed therein to receive the outer ends of said cylinders.

In testimony whereof I have hereunto set my hand in presence of two subscribing witnesses.

LYCURGUS ANDERSON.

Witnesses:
GEORGE T. ANDERSON,
H. H. OWINGS.

Copies of this patent may be obtained for five cents each, by addressing the "Commissioner of Patents, Washington, D. C."